US012443213B2

(12) United States Patent
Kimura

(10) Patent No.: US 12,443,213 B2
(45) Date of Patent: Oct. 14, 2025

(54) REFERENCE CURRENT GENERATION CIRCUIT

(71) Applicant: WILL SEMICONDUCTOR (SHANGHAI) CO. LTD., Shanghai (CN)

(72) Inventor: Hiroyuki Kimura, Miyagi (JP)

(73) Assignee: WILL SEMICONDUCTOR (SHANGHAI) CO. LTD., Shanghai (CN)

( * ) Notice: Subject to any disclaimer, the term of this patent is extended or adjusted under 35 U.S.C. 154(b) by 352 days.

(21) Appl. No.: 18/166,265

(22) Filed: Feb. 8, 2023

(65) Prior Publication Data

US 2024/0176380 A1 May 30, 2024

(30) Foreign Application Priority Data

Nov. 29, 2022 (CN) ......................... 202211513676.1

(51) Int. Cl.
*G05F 3/26* (2006.01)
*G05F 1/56* (2006.01)
*G05F 3/24* (2006.01)

(52) U.S. Cl.
CPC .............. *G05F 3/262* (2013.01); *G05F 1/561* (2013.01); *G05F 3/24* (2013.01); *G05F 3/245* (2013.01)

(58) Field of Classification Search
CPC ..... G05F 3/00; G05F 3/02; G05F 3/04; G05F 3/08; G05F 3/10; G05F 3/12; G05F 3/16; G05F 3/18; G05F 3/20; G05F 3/205; G05F 3/22; G05F 3/26; G05F 3/262; G05F 3/267; G05F 3/30; G05F 3/24–245
See application file for complete search history.

(56) References Cited

U.S. PATENT DOCUMENTS 4,550,262 A * 10/1985 Kohsiek .................. G05F 1/561
330/288

FOREIGN PATENT DOCUMENTS

DE 10328605 A1 * 1/2005 ............. G05F 3/262

* cited by examiner

*Primary Examiner* — Alex Torres-Rivera
*Assistant Examiner* — Ularislao Cordova
(74) *Attorney, Agent, or Firm* — Muncy, Geissler, Olds & Lowe, P.C.

(57) ABSTRACT

A circuit includes a third current mirror, through which a current obtained by adding a first reference current copied by a first current mirror and a second reference current copied by a second current mirror is made to flow; a reference resistor of a first type, through which the first reference current obtained by subtracting the second reference current from one output of the third current mirror is made to flow; and a reference resistor of a second type, through which the second reference current obtained by subtracting the first reference current from the other output of the third current mirror is made to flow. By the third current mirror, voltage drops at the reference resistors of the first type and the second type are the same, and the second reference current is set to be inversely proportional to the resistance value of the reference resistor of the second type.

3 Claims, 2 Drawing Sheets

REFERENCE CURRENT GENERATION CIRCUIT

BACKGROUND OF THE INVENTION

1. Field of the Invention

The disclosure relates to a reference current generation circuit that generates a reference current based on a second reference resistor of a different type from a first-type resistor.

2. Description of the Related Art

Conventionally, there are many circuit blocks in an analog semiconductor integrated circuit. In these circuit blocks, it may be desirable to operate based on the same reference current. Therefore, from a reference current which is generated using one reference resistor, a copy thereof is generated, and the copy thereof is used as a reference current of each circuit block.

Here, due to the difference in the type of resistors or the like in the circuit block, it may be desirable to utilize a reference current using a reference resistor having a different characteristic (for example, temperature characteristic).

In this case, it is sufficient to arrange a circuit that generates a reference current based on a reference resistor having a different characteristic, but an independent reference current generation circuit is therefore required.

SUMMARY OF THE INVENTION

A reference current generation circuit related to the disclosure includes:

a first current mirror, copying a first reference current;

a second current mirror, copying a second reference current;

a third current mirror, through which a current obtained by adding the first reference current copied by the first current mirror and the second reference current copied by the second current mirror is made to flow;

a reference resistor of the first type, through which the first reference current obtained by subtracting the second reference current copied by the second current mirror from one output of the third current mirror is made to flow, and a reference resistor of the second type, through which the second reference current obtained by subtracting the first reference current copied by the first current mirror from the other output of the third current mirror is made to flow; where by the third current mirror, voltage drops at the reference resistor of the first type and the reference resistor of the second type are made the same, and the second reference current is set to be inversely proportional to the resistance value of the reference resistor of the second type.

According to the disclosure, a second reference current using a reference resistor of the second type can be generated by utilizing a first reference current using a reference resistor of the first type without providing an independent reference current generation circuit.

PREFERRED EMBODIMENT OF THE PRESENT INVENTION

Hereinafter, embodiments of the disclosure are described with reference to the drawings. Note that, the following embodiments do not limit the scope of the disclosure, and configurations obtained by selectively combining multiple examples are also included in the disclosure.

"Circuit Configuration"

Figure 1:
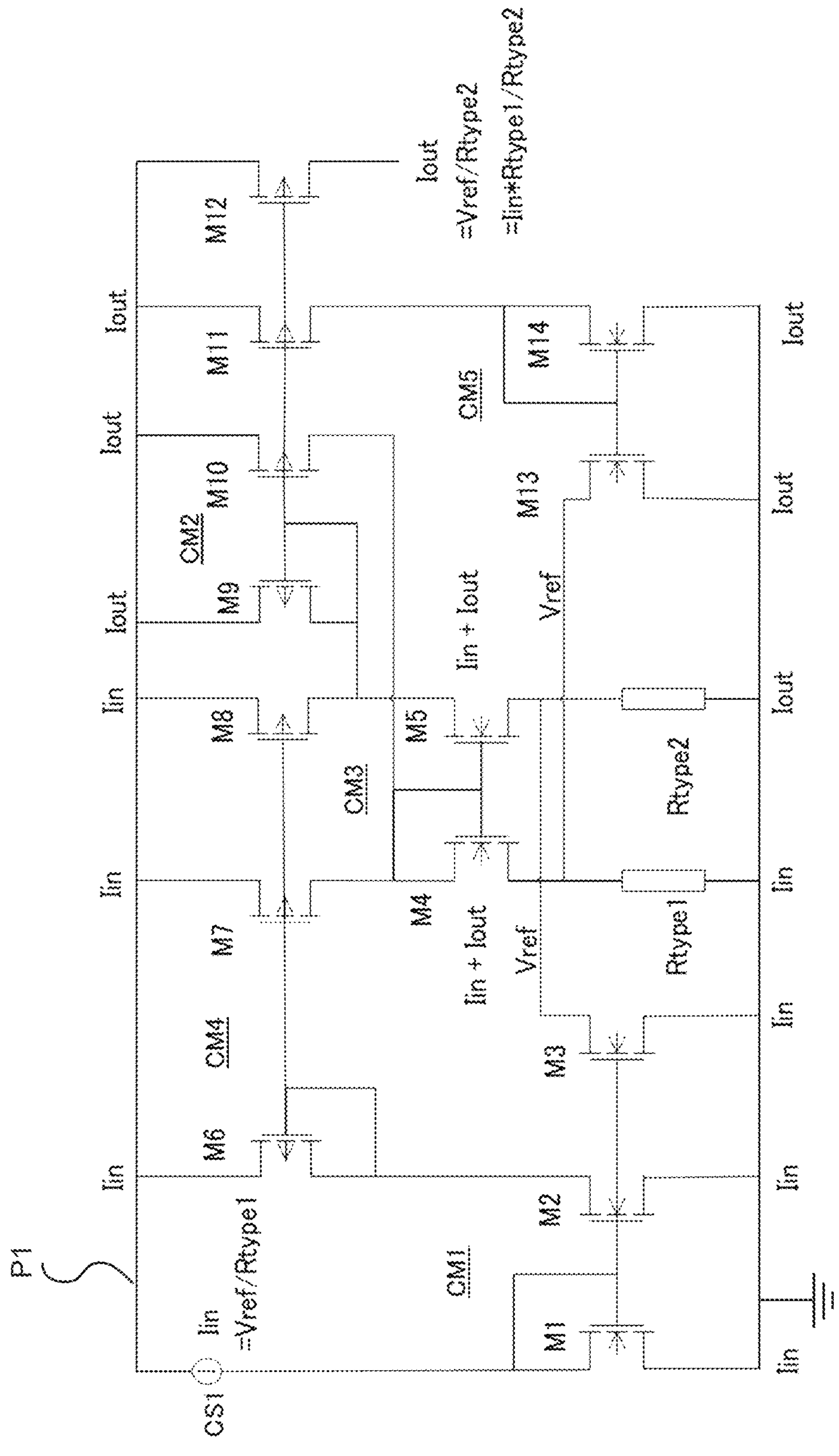
FIG. 1 is a diagram showing a configuration of a reference current generation circuit according to an embodiment of the disclosure.

FIG. 1 is a diagram showing a configuration of a reference current generation circuit according to an embodiment of the disclosure. Note that, this reference current generation circuit uses a MOSFET as a transistor.

One end of a current source CS1 is connected to a power supply line P1, and a current Iin generated by another reference current generation circuit is made to flow through the current source CS1. Note that, the current source CS1 may also be a reference current generation circuit. The current Iin is referred to as the first reference current.

The current Iin is supplied to a transistor M1, which is an input side of a current mirror CM1. To note on the transistor M1, the transistor M1 is N-type, there is a short (diode connection) between the gate and the drain, and the current Iin is made to directly flow. The source of the transistor M1 is connected to ground (or a low-voltage power supply). Note that, the current mirror CM1 is referred to as the first current mirror.

The gates of two N-type transistors M2 and M3 are commonly connected to the gate of the transistor M1. The sources of the transistors M2 and M3 are connected to the same ground as the source of the transistor M1. Thus, the transistor M1 and the transistors M2 and M3 constitute the current mirror CM1. Therefore, the transistors M2 and M3 copy the current of the transistor M1, and the current Iin is made to flow through the transistors M2 and M3.

The drain of the transistor M2 is connected to a power supply via a transistor M6. To note on the transistor M6, the transistor M6 is P-type, there is a short between the drain and the gate, and the source of which is connected to the power supply. Therefore, the current Iin is also made to flow through the transistor M6. The gates of transistors M7 and M8 are connected to the gate of the transistor M6, the transistors M7 and M8 being also P-type and the sources of the transistors M7 and M8 being also connected to the power supply. The transistor M6 and the transistors M7 and M8 constitute a current mirror CM4. Thus, the transistors M7 and M8 copy the current of the transistor M6, and the current Iin is made to flow through the transistors M7 and M8. Note that, the current mirror CM4 is referred to as the fourth current mirror.

The drain of an N-type transistor M4 is connected to the drain of the transistor M7. To note on the transistor M4, there is a short between the drain and the gate. Furthermore, the source of the transistor M4 is connected to the ground via a reference resistor of the first type Rtype1.

The drain of an N-type transistor M5 is connected to the drain of the transistor M8. The gate of the transistor M5 is connected to the gate of the transistor M4. Furthermore, the source of the transistor M5 is connected to the ground via a reference resistor of the second type Rtype2.

Thus, the transistors M4 and M5 and the reference resistors Rtype1 and Rtype2 constitute a current mirror CM3.

Therefore, the transistor M5 copies the current of the transistor M4. Note that, the current mirror CM3 is referred to as the third current mirror.

In addition, to note on a P-type transistor M9, the source of which is connected to the power supply and there is a short between the gate and the drain, and the P-type transistor M9 is connected to the drain of the transistor M8. The gate of a transistor M10 which is also P-type is connected to the gate of the transistor M9. The source of the transistor M10 is connected to the power supply, and the drain of the transistor M10 is connected to the drain of the transistor M8. The gates of transistors M11 and M12 which are also P-type are also connected to the gate of the transistor M9. The sources of the transistors M11 and M12 are also connected to the power supply. Thus, the transistor M9 and the transistors M10, M11, and M12 constitute a current mirror CM2. The transistors M10, M11, and M12 copy the current of the transistor M9. When the current flowing through the transistor M9 is set to a current Iout, the current Iout also flows through the transistors M10, M11, and M12. Note that, the current mirror CM2 is referred to as the second current mirror, and the current Iout is referred to as the second reference current.

The drain of an N-type transistor M14 is connected to the drain of the transistor M11. To note on the transistor M14, there is a short between the drain and the gate, and the source of which is connected to the ground. The gate of a transistor M13 is connected to the gate of the transistor M14. The source of the transistor M13 is connected to the ground, and the transistor M13 and the transistor M14 constitute a current mirror CM5. Thus, the transistor M13 copies the current of the transistor M14, and the current Iout flows through the transistor M13. Note that, the current mirror CM5 is referred to as the fifth current mirror.

The drain of the transistor M13 is connected to a connection point between the source of the transistor M4 and the reference resistor Rtype1. In addition, the drain of the transistor M3 is connected to a connection point between the source of the transistor M5 and the reference resistor Rtype2.

The current Iin flows through the transistors M7 and M8, and the current Iout flows through the transistors M10 and M9, and thus a current Iin+Iout flows through the transistors M4 and M5. In addition, the current Iout flowing through the transistor M13 is subtracted from the current Iin+Iout flowing through the transistor M4, and thus the current Iin flows through the reference resistor Rtype1.

On the other hand, the current Iin flowing through the transistor M3 is subtracted from the current Iin+Iout flowing through the transistor M5, and thus the current Iout flows through the reference resistor Rtype2.

Here, the gates of the transistor M4 and the transistor M5 are commonly connected, and the source voltages of the transistor M4 and the transistor M5 are the same. Thus, a voltage drop Iin*Rtype1 at the reference resistor Rtype1 and a voltage drop Iout*Rtype2 at the reference resistor Rtype2 are the same in reference voltage Vref.

That is, $$Iin=Vref/Rtype1,$$

$$Iout=Vref/Rtype2, \text{ and}$$

$$Iout=Iin*Rtype1/Rtype2.$$

The gate of the P-type transistor M12 is connected to the gate of the transistor M9, and the source of the transistor M12 is connected to the power supply. Therefore, the current Iout flows from the drain of the transistor M12, and is used as a reference current based on the reference resistor Rtype2 in a predetermined circuit block.

In this way, according to the reference current generation circuit according to the embodiment, the reference current Iout based on the reference resistor Rtype2 having a different characteristic with the reference resistor Rtype1 can be generated by utilizing the reference current Iin based on the reference resistor Rtype1, and a reference current based on the reference resistor Rtype2 can be generated by a relatively simple circuit.

By the current mirror CM3, the voltage drops at the reference resistor of the first type Rtype1 and the reference resistor of the second type Rtype2 are made the same, and the second reference current can be set to be inversely proportional to the resistance value of the reference resistor of the second type Rtype2.

"Configuration of Variation Example"

Figure 2:
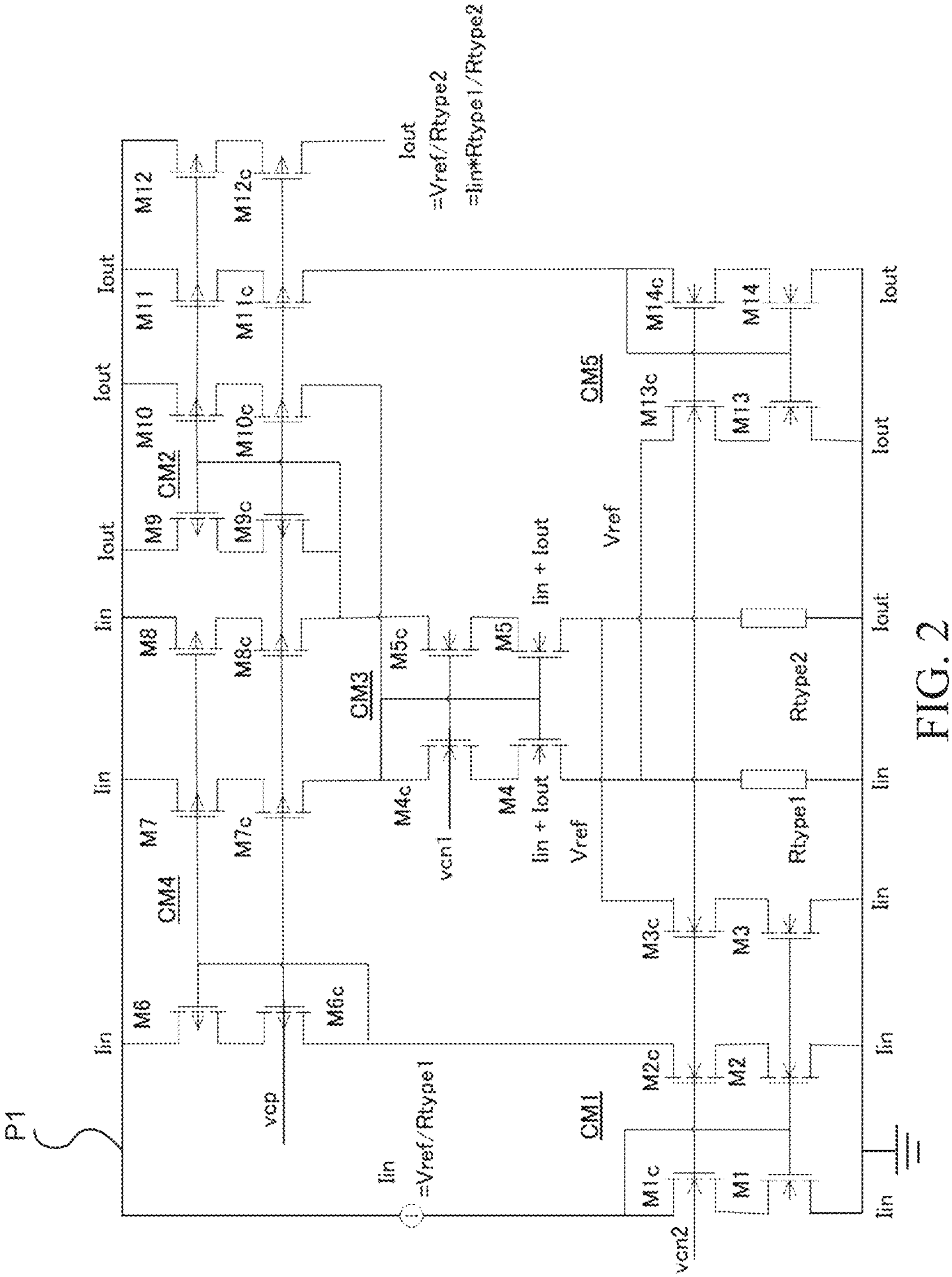
FIG. 2 is a diagram showing a configuration of a variation example of a reference current generation circuit according to an embodiment of the disclosure.

FIG. 2 is a diagram showing a configuration of a variation example of a reference current generation circuit according to an embodiment of the disclosure. In this variation example, the transistors constituting the current mirrors are replaced with transistors of cascode type.

That is, for the current mirror CM1 including the N-type transistors M1, M2, and M3, N-type transistors M1*c*, M2*c*, and M3*c* are added to an upstream side thereof. The drain of the transistor M1*c* on an input side and the gate of the transistor M1 are shorted, a voltage vcn2 is supplied to the gates of the transistors M1*c*, M2*c*, and M3*c* to turn on the transistors M1*c*, M2*c*, and M3*c*. As a result, the drain voltages of the transistors M1, M2, and M3 are set to a same voltage, and the accuracy of the current mirror can be improved.

For the current mirror CM4 including the P-type transistors M6, M7, and M8, the current mirror CM3 including the N-type transistors M4 and M5, the current mirror CM2 including the P-type transistors M9, M10, M11, and M12, and the current mirror CM5 including the N-type transistors M14 and M13, transistors M6*c*, M7*c*, M8*c*, M4*c*, M5*c*, M9*c*, M10*c*, M11*c*, M12*c*, M14*c*, and M13*c* are added to cause the current mirrors to be of cascode type. A voltage vcn1 is supplied to the gates of the transistors M4*c* and M5*c*. A voltage vcp is supplied to the gates of the transistors M6*c*, M7*c*, M8*c*, M9*c*, M10*c*. M11*c*, and M12*c*.

Accordingly, by causing the current mirrors to be of cascode type, the gate-source voltage of the transistors constituting the current mirror can be made the same on an input side and an output side, and the accuracy thereof can be improved.

"Other Configurations"

Moreover, even the P-type and the N-type of the transistors in the embodiments of FIG. 1 and FIG. 2 are exchanged and directions of the currents Iin and Iout are reversed, the current Iout can also be obtained similarly. The currents Iin and Iout added to an upstream side of the current mirror CM3 and the currents Iin and Iout subtracted from a downstream may be provided from a current mirror constituted by transistors of the opposite type.

In addition, in this current mirror, the sizes of the transistors on the input side and the output side are made to be the same, and a same current is made to flow on the input side and the output side. However, the sizes of the transistors on the input side and the output side can also be made different. However, in this case, it is also required to use only Iin and Iout as the currents flowing through the reference resistors Rtype1 and Rtype2.

What is claimed is:

1. A reference current generation circuit, comprising:

a first current mirror, copying a first reference current;

a second current mirror, copying a second reference current;

a third current mirror, through which a current obtained by adding the first reference current copied by the first current mirror and the second reference current copied by the second current mirror is made to flow;

a reference resistor of a first type, through which the first reference current obtained by subtracting the second reference current copied by the second current mirror from one output of the third current mirror is made to flow; and a reference resistor of a second type, through which the second reference current obtained by subtracting the first reference current copied by the first current mirror from the other output of the third current mirror is made to flow; wherein by the third current mirror, voltage drops at the reference resistor of the first type and the reference resistor of the second type are made the same, and the second reference current is set to be inversely proportional to the resistance value of the reference resistor of the second type.

2. The reference current generation circuit according to claim 1, wherein the first reference current copied by the first current mirror is copied by a fourth current mirror and then added to an upstream of the third current mirror, and the first reference current copied by the first current mirror is subtracted from an upstream of the reference resistor of the second type.

3. The reference current generation circuit according to claim 1, wherein the second reference current copied by the second current mirror is added to an upstream of the third current mirror, and the first reference current copied by the second current mirror is copied by a fifth current mirror and then subtracted from an upstream of the reference resistor of the first type.

* * * * *